US012487450B2

(12) United States Patent
Li et al.

(10) Patent No.: US 12,487,450 B2
(45) Date of Patent: Dec. 2, 2025

(54) DUST COLLECTING AND BLOCKING MEMBER, CAMERA MODULE WITH MEMBER, AND ELECTRONIC DEVICE WITH CAMERA MODULE

(71) Applicant: TRIPLE WIN TECHNOLOGY(SHENZHEN) CO. LTD., Shenzhen (CN)

(72) Inventors: Kun Li, Guangdong (CN); Yu-Xiang Yan, New Taipei (TW); Shin-Wen Chen, New Taipei (TW); Jian-Chao Song, Guangdong (CN); Wu-Tong Wang, Jincheng (CN)

(73) Assignee: TRIPLE WIN TECHNOLOGY(SHENZHEN) CO. LTD., Shenzhen (CN)

( * ) Notice: Subject to any disclaimer, the term of this patent is extended or adjusted under 35 U.S.C. 154(b) by 598 days.

(21) Appl. No.: 17/899,001

(22) Filed: Aug. 30, 2022

(65) Prior Publication Data
US 2023/0418050 A1 Dec. 28, 2023

(30) Foreign Application Priority Data
Jun. 28, 2022 (CN) .......................... 202210784393.4

(51) Int. Cl.
*G02B 27/00* (2006.01)

(52) U.S. Cl.
CPC ................... *G02B 27/0006* (2013.01)

(58) Field of Classification Search
CPC ..................................... G02B 27/0006
See application file for complete search history.

(56) References Cited

U.S. PATENT DOCUMENTS

2017/0363837 A1* 12/2017 Fan .......................... G02B 7/09
2022/0066129 A1* 3/2022 Chen .................... G02B 13/001

FOREIGN PATENT DOCUMENTS

TW          I400550 B        7/2013
TW          I692671 B        5/2020

* cited by examiner

*Primary Examiner* — Mariam Qureshi
(74) *Attorney, Agent, or Firm* — ScienBiziP, P.C.

(57) ABSTRACT

A dust collecting and blocking member with an aperture for a camera module, includes a frame body and an adhesive connected to the frame body. The frame body includes a first surface and a second surface opposites to the first surface, the aperture penetrates the first surface and the second surface, the first surface is recessed inwardly to form an annular groove, the annular groove circles the aperture. The adhesive is disposed inside the annular groove, and the frame body and adhesive function together to block trap and hold any dust present during manufacture of the camera module, to avoid an image quality which is less than optimal.

6 Claims, 6 Drawing Sheets

DUST COLLECTING AND BLOCKING MEMBER, CAMERA MODULE WITH MEMBER, AND ELECTRONIC DEVICE WITH CAMERA MODULE

FIELD

The subject matter herein generally relates to imaging, and more particularly, to a dust collecting and blocking member, and a camera module having the dust blocking member, and an electronic device having the camera module.

BACKGROUND

A camera module may include a lens, a filter, and a photosensitive chip, from object side to image side. However, during an assembly process of the camera module, dust may fall on the filter or the photosensitive chip, which lowers an imaging quality of the camera module.

BRIEF DESCRIPTION OF THE DRAWINGS

Many aspects of the disclosure can be better understood with reference to the following drawings. The components are not necessarily drawn to scale, the emphasis instead being placed upon clearly illustrating the principles of the disclosure.

DETAILED DESCRIPTION

Figure 1:
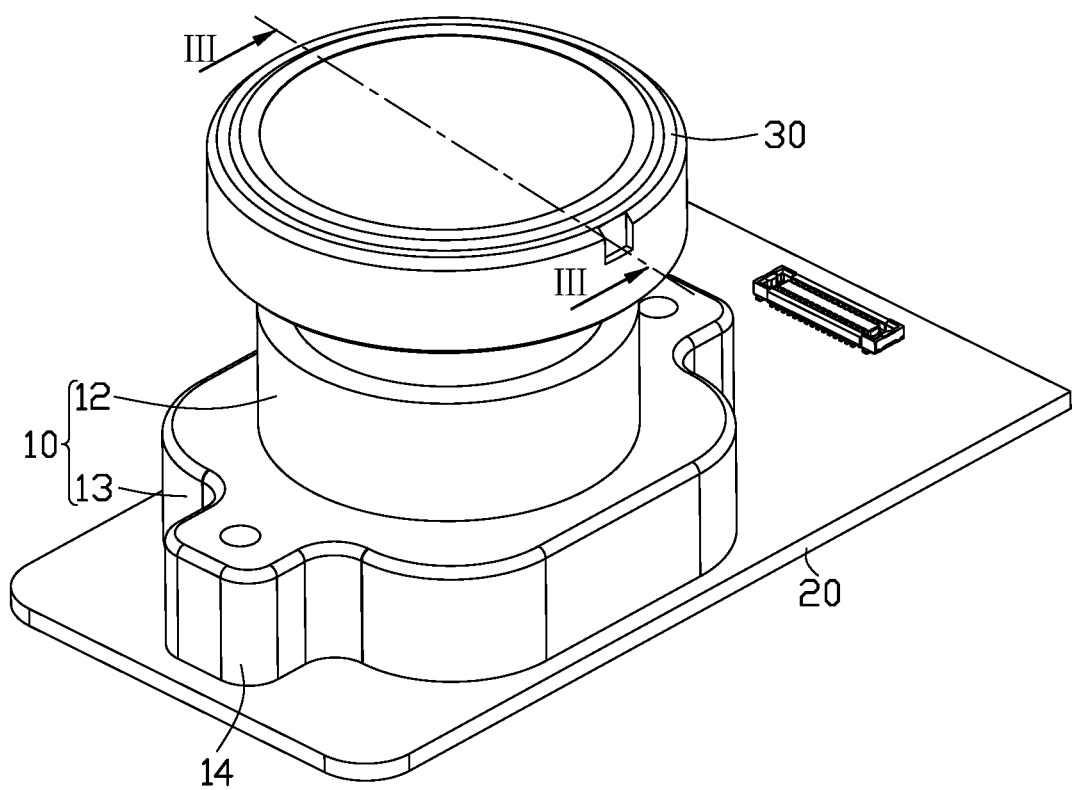
FIG. 1 is a diagrammatic view of a camera module according to an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Referring to FIG. 1, an embodiment of a camera module 100 is provided. The camera module 100 can be used in any electronic device 300 (refer to FIG. 8) with an image capturing function.

Figure 2:
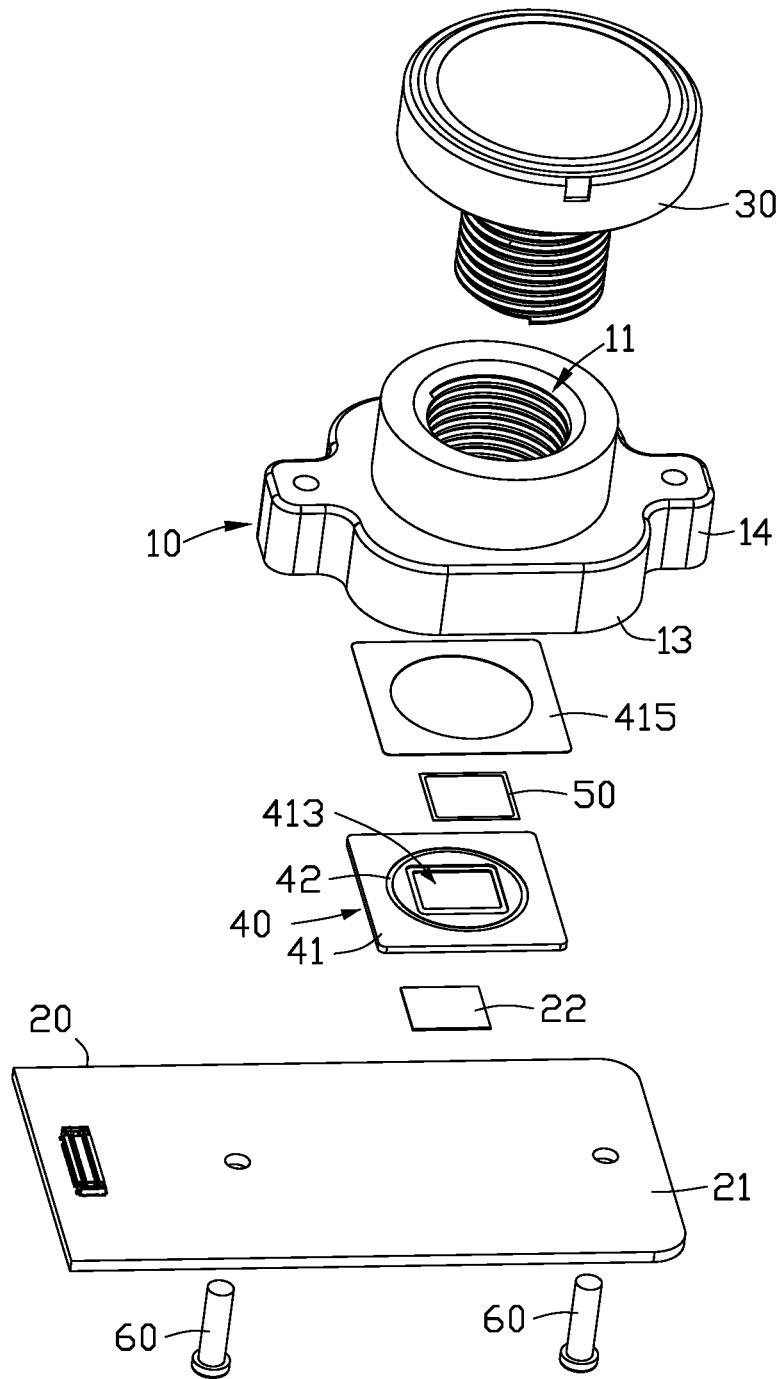
FIG. 2 is an exploded view of the camera module of FIG. 1.
Figure 3:
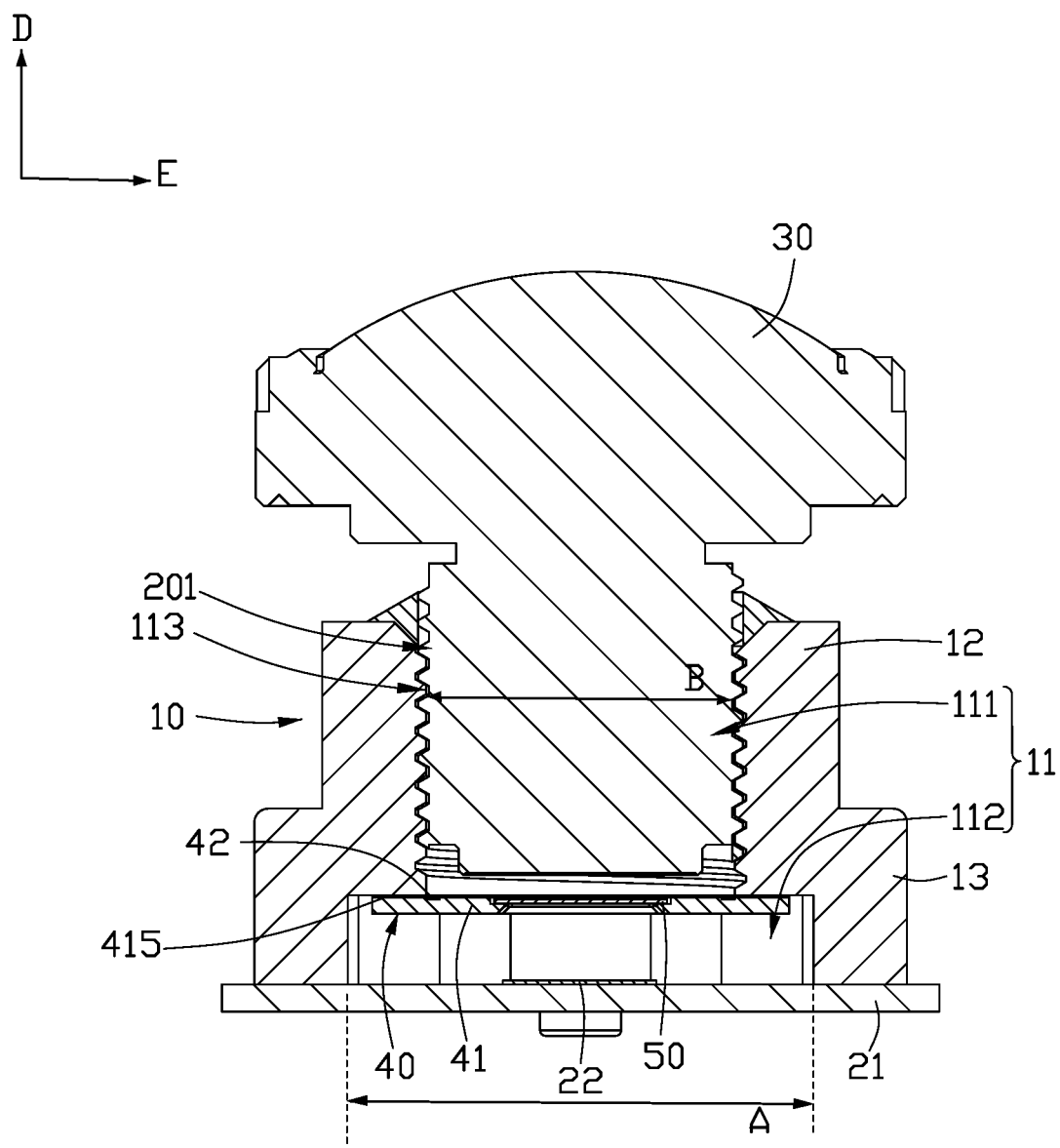
FIG. 3 is a cross sectional view along line of FIG. 1.

Referring to FIGS. 2 and 3, the camera module 100 includes a base 10, a circuit board assembly 20, a lens assembly 30, and a dust collecting and blocking member 40. The base 10 defines a through hole 11. A portion of the lens assembly 30 is disposed within the through hole 11, and another portion of the lens assembly 30 protrudes from an end of the through hole 11. The circuit board assembly 20 covers other end of the through hole 11.

Figure 4:
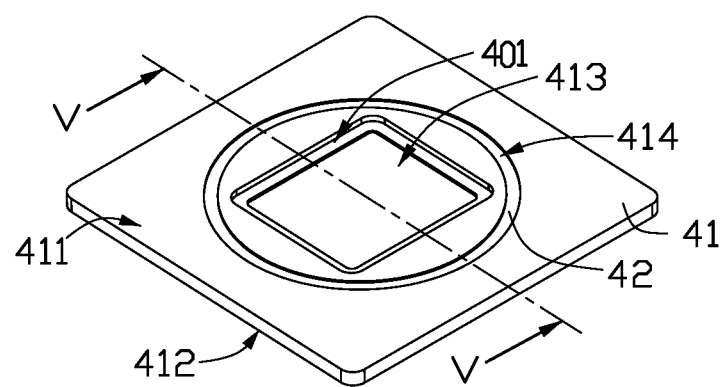
FIG. 4 is a diagrammatic view of a dust collecting and blocking member of the camera module of FIG. 1.
Figure 5:
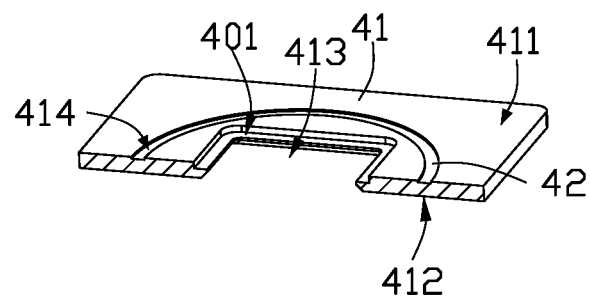
FIG. 5 is a cross sectional view along line V-V of FIG. 4.

The dust bocking member 40 is arranged within the through hole 11, and located between the circuit board assembly 20 and the lens assembly 30. Referring to FIGS. 4 and 5, the dust bocking member 40 includes a frame body 41 and an adhesive 42. The frame body 41 includes a first surface 411 and a second surface 412 opposite to the first surface 411. The first surface 411 faces the lens assembly 30. The second surface 412 faces the circuit board assembly 20. The frame body 41 defines an aperture 413. The aperture 413 penetrates the first surface 411 and the second surface 412. The first surface 411 is further recessed inwardly to form an annular groove 414. The annular groove 414 surrounds the aperture 413. The adhesive 42 is arranged within the annular groove 414. Light beams (not shown) passing through the lens assembly 30 can travel through the lens assembly 30 and arrive at the circuit board assembly 20.

During an assembly process of the camera module 100, the dust blocking member 40 is installed into the through hole 11, and then the lens assembly 30 is installed into the through hole 11. Thus, any dust particle which is present during installation of the lens assembly 30 is either blocked by the frame body 41 or is adhered to the adhesive 42, thereby keeping the optical components in the path of the light beams completely dust-free and ensuring optimal image quality.

Figure 6:
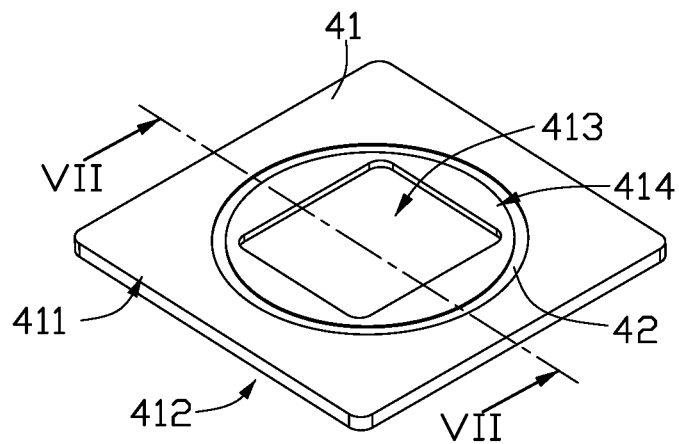
FIG. 6 is a diagrammatic view of a dust collecting and blocking member according to another embodiment of the present disclosure.
Figure 7:
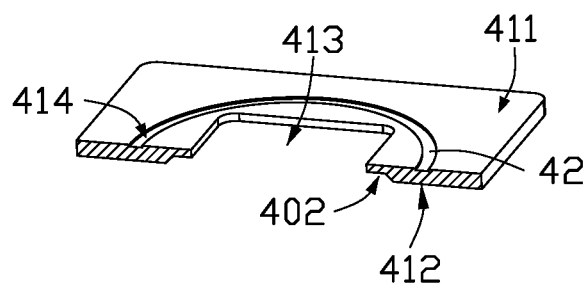
FIG. 7 is a cross sectional view along line VII-VII of FIG. 6.

Referring to FIGS. 4 and 5, in this embodiment, the camera module 100 further includes an optical filter 50. The first surface 411 is further recessed inwardly to form a first receiving groove 401. The first receiving groove 401 surrounds the aperture 413. The annular groove 414 surrounds the first receiving groove 401. The optical filter 50 is disposed within the first receiving groove 401 to cover the aperture 413. The optical filter 50 is an infrared cut-off filter, which is used for blocking infrared light. Referring to FIGS. 6 and 7, in another embodiment, the second surface 412 is recessed inwardly to form a second receiving groove 402, and the second receiving groove 402 surrounds the aperture 413. The optical filter 50 is disposed within the second receiving groove 402.

Referring to FIGS. 2 and 3, in this embodiment, a first direction D is defined as a direction parallel to the axis of the through hole 11. The base 10 includes a first portion 12 and second portion 13 connected to the first portion 12. The first portion 12 is a hollow cylinder. The second portion 13 is a hollow rectangle. Along the first direction D, the forward projection of the first portion 12 falls within the second portion 13. The first portion 12 defines a first receiving hole 111. The second portion 13 defines a second receiving hole 112 communicating with the first receiving hole 111 to form the through hole 11. The diameter of the first receiving hole 111 is less than the diameter of the second receiving hole 112. Thereby, along the first direction D, the forward projection of the first receiving hole 111 falls within the second receiving hole 112. A portion of the lens assembly 30 is disposed within the first receiving hole 111. The frame body 41 is disposed within the second receiving hole 112. The adhesive 42 faces and communicates with the first receiving hole 111, so that the adhesive 42 can gather any dust particle falling from the first receiving hole 111. In this embodiment, the frame body 41 is disposed within the second receiving hole 112 through a bonding layer 415. The bonding layer 415 is made of epoxy resin.

Referring to FIG. 3, in this embodiment, the lens assembly 30 defines a plurality of external screw threads 201, and the first portion 12 defines a plurality of internal screw threads 113 at the sidewall of the first receiving hole 111. The external screw threads 201 engage with the internal screw threads 113, so that the lens assembly 30 can be mounted into the first receiving hole 111.

Referring to FIGS. 2 and 3, in this embodiment, a second direction E is defined as a direction perpendicular to the first direction D. A portion of the second portion 13 protrudes from the other portion of the second portion 13 along the second direction E to form two mounting bases 14. The two mounting bases 14 are symmetrical around the center of through hole 11. The two mounting bases 14 are connected to the circuit board assembly 20. In this embodiment, the camera module 100 further includes two fasteners 60. The two fasteners 60 connect the two mounting bases 14 to the circuit board assembly 20. The fasteners 60 may be bolts, rivets, or nuts.

Referring to FIGS. 2 and 3, the circuit board assembly 20 includes a circuit board 21 and a sensor 22. The circuit board 21 is connected to the second portion 13 and the mounting bases 14 to cover the second receiving hole 112. The sensor 22 is connected to a surface of the circuit board 21 and faces the optical filter 50. The sensor 22 is disposed within the second receiving hole 112.

Figure 8:
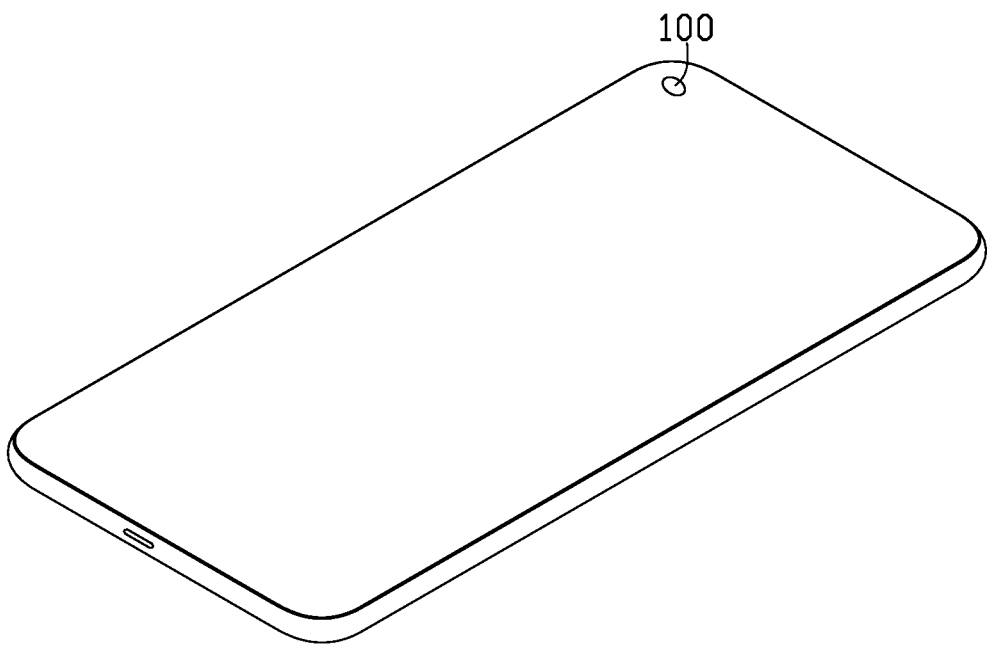
FIG. 8 is a diagrammatic view of an electronic device according to an embodiment of present disclosure.

Referring to FIG. 8, an embodiment of an electronic device 200 is provided. The electronic device 200 includes the camera module 100. The electronic device 200 may be mobile phone, smart watch, computer, IPAD, or any other electronic device 200 with function of image capturing.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:

1. A camera module comprising:
a base defining a through hole;
a lens assembly disposed in the through hole;
a circuit board assembly connected to the base and covering the through hole; and
a dust blocking member disposed in the through hole, the dust blocking member arranged between the lens assembly and the circuit board assembly;
wherein the dust blocking member comprises a frame body and an adhesive connected to the frame body, wherein the frame body comprises a first surface and a second surface opposites to the first surface, the frame body defines an aperture penetrating the first surface and the second surface, the first surface is recessed inwardly to form an annular groove, the annular groove surrounds the aperture, and the adhesive is disposed in the annular groove;
wherein the base comprises a first portion and a second portion connected to the first portion, the first portion defines a first receiving hole, the second portion defines a second receiving hole, the first receiving hole is connected to the second receiving hole to form the through hole, a diameter of the first receiving hole is less than a diameter of the second receiving hole, a portion of the lens assembly is disposed within the first receiving hole, and the circuit board assembly covers the second receiving hole, along a direction parallel to an axis of the through hole, a forward projection of the first portion falls within the second portion;
wherein the frame body is disposed within the second receiving hole such that the adhesive faces and communicates with the first receiving hole to collect dust particles falling from the first receiving hole.

2. The camera module of claim 1, wherein the lens assembly defines a plurality of external screw threads, the first portion defines a plurality of internal screw threads on a sidewall of the first receiving hole, the plurality of external screw threads suits the plurality of external internal screw threads.

3. The camera module of claim 1, further comprises an optical filter, wherein the first surface is recessed inwardly to form a first receiving groove, the first receiving groove surrounds the aperture, and the optical filter is disposed in the first receiving groove and covers the aperture.

4. The camera module of claim 1, further comprises an optical filter, wherein the second surface is recessed inwardly to form a second receiving groove, the second receiving groove surrounds the aperture, and the optical filter is disposed within the second receiving groove and covers the aperture.

5. The camera module of claim 1, wherein the circuit board assembly comprises a circuit board and a sensor connected to the circuit board, the sensor is disposed in the second receiving hole, the circuit board covers the second receiving hole, and the sensor faces the aperture and the lens assembly.

6. The camera module of claim 5, wherein a portion of the second portion protrudes from the other portion of the second portion to form two mounting base, the two mounting bases are symmetrical with respect to each other, the two mounting bases are connected to the circuit board.

* * * * *